United States Patent
Lin (10) Patent No.: US 9,727,771 B2
(45) Date of Patent: Aug. 8, 2017

(54) TOUCH DEVICE WITH FINGERPRINT IDENTIFICATION FUNCTION

(71) Applicant: Chih-Chung Lin, Taipei (TW)

(72) Inventor: Chih-Chung Lin, Taipei (TW)

(*) Notice: Subject to any disclaimer, the term of this patent is extended or adjusted under 35 U.S.C. 154(b) by 0 days.

(21) Appl. No.: 14/685,603

(22) Filed: Apr. 14, 2015

(65) Prior Publication Data

US 2016/0307022 A1    Oct. 20, 2016

(51) Int. Cl.
*G06F 3/041* (2006.01)
*G06F 3/044* (2006.01)
*G06K 9/00* (2006.01)

(52) U.S. Cl.
CPC ......... *G06K 9/00033* (2013.01); *G06F 3/041* (2013.01); *G06F 3/044* (2013.01)

(58) Field of Classification Search
CPC ............. G06K 9/00013; G06K 9/0002; G06K 9/00033; G06K 9/0004; G06K 9/00046; G06K 9/00053; G06K 9/0006; G06F 3/0488; G06F 3/04883; G06F 3/044; G06F 3/041; G06F 3/04886; G06F 3/045; G06F 3/0412; G06F 3/0416; G06F 3/046; G06F 3/0421; G06F 3/042; G06F 3/03545; G06F 3/0317; G06F 3/037; G06F 3/0436; G06F 3/0433; G06F 3/0418; G06F 3/033
See application file for complete search history.

(56) References Cited

U.S. PATENT DOCUMENTS

| | | | | |
|---|---|---|---|---|
| 2014/0129843 A1* | 5/2014 | Shi | ........................ | G06F 21/32 713/182 |
| 2014/0313169 A1* | 10/2014 | Kravets | ................... | G06F 3/044 345/178 |
| 2014/0333582 A1* | 11/2014 | Huo | ..................... | G02F 1/13338 345/174 |
| 2015/0177884 A1* | 6/2015 | Han | ........................ | G06F 3/044 345/174 |

FOREIGN PATENT DOCUMENTS

| | | |
|---|---|---|
| TW | M405648 U1 | 6/2011 |
| TW | M496807 U | 3/2015 |

* cited by examiner

*Primary Examiner* — Temesghen Ghebretinsae
*Assistant Examiner* — Lisa Landis
(74) *Attorney, Agent, or Firm* — C. G. Mersereau; Nikolai & Mersereau, P.A.

(57) ABSTRACT

A touch device with fingerprint identification function includes a glass substrate having a first and a second face, a first electrode layer having multiple first electrodes, an insulation layer, a second electrode layer having multiple second electrodes, a wiring layer, a film layer covering the second electrode layer and the wiring layer, and a fingerprint identification sensation layer having multiple fingerprint identification chips and multiple transmission leads. The first face is defined with a touch section and a non-touch section. The first electrode layer is disposed on the second face. One face of the insulation layer covers the first electrode layer. The second electrode layer is disposed on the other face of the insulation layer. The wiring layer is disposed at the non-touch section and selectively electrically (Continued)

connected to the first and second electrode layers. The touch device is able to lower manufacturing cost and enhance fingerprint identification precision.

5 Claims, 7 Drawing Sheets

TOUCH DEVICE WITH FINGERPRINT IDENTIFICATION FUNCTION

BACKGROUND OF THE INVENTION

1. Field of the Invention

The present invention relates generally to a touch device with fingerprint identification function, and more particularly to a touch device with fingerprint identification function, in which the fingerprint identification chips are integrated on a touch panel.

2. Description of the Related Art

Along with the rapid advance of multimedia technique, more and more easy portable intelligent electronic devices have been developed and become inevitable implements in our daily life, such as personal digital assistant (PDA), digital camera, personal notebook, tablet and wearable device. These portable electronic devices are quite personalized. Therefore, in case a user misses the portable electronic devices or the portable electronic devices are burglarized, all the data stored in the portable electronic devices, such as telephone book, photos, etc. may be utilized by unauthorized persons to cause unnecessary loss.

Therefore, such product necessitates a certain identity certification and authorization management to ensure the privacy of a user. The currently used identity certification means is mainly password protection. A user needs to first input correct password to the portable electronic device for access to the operation page of the portable electronic device. However, the security of the password protection is lower. This is because the password is likely to leak or break. Moreover, in case the user forgets the password, it will be quite troublesome. Therefore, portable electronic devices with fingerprint identification function for identity certification have been developed and commercially available. Human fingerprints are characterized by their uniqueness so that the security of the identity certification by fingerprint identification is much higher. In addition, the fingerprint identification for identity certification is relatively convenient to a user. The user can save the troubles of memorization and input of the password.

The existent fingerprint identification system is wisely applied to handheld device or mobile device. The most often seen fingerprint identification device is independently designed on one side of the keyboard of such as a notebook or backside or bottom side of one end of the handheld mobile device in a fixed position. The fingerprint identification device can be hardly integrated on the touch screen of the handheld mobile device to minify the volume of the handheld mobile device. Furthermore, the conventional fingerprint identification chip packaging module mainly includes a substrate, chips and packaging body. The chips are disposed on the substrate and electrically connected therewith. The packaging body is overlaid on the surface of the substrate and the chips.

The chip is coated with multiple layers of films so that the total thickness of the chip packaging module is thicker. Therefore, in general, when a finger touches the sensation section of the chip, the sensitivity of the chip packaging module is lowered.

In addition, the conventional slide-type fingerprint identification system has directionality. Moreover, the identification time is too long and the identifiability is poor. Also, the conventional slide-type fingerprint identification system must be independently arranged. Therefore, the conventional slide-type fingerprint identification system can be hardly integrated with the touch screen and it is inconvenient to use such fingerprint identification system.

SUMMARY OF THE INVENTION

It is therefore a primary object of the present invention to provide a touch device with fingerprint identification function, in which the fingerprint identification chips and the touch panel are integrated.

To achieve the above and other objects, the touch device with fingerprint identification function of the present invention includes a glass substrate, a first electrode layer, an insulation layer, a second electrode layer, a wiring layer, a film layer and a fingerprint identification sensation layer.

The glass substrate has a first face and a second face respectively disposed on upper and lower sides of the glass substrate. The first face is defined with a touch section and a non-touch section. The non-touch section is in adjacency to the touch section. The first electrode layer is disposed on the second face of the glass substrate. The first electrode layer has multiple first electrodes. The insulation layer covers the first electrode layer. The second electrode layer is disposed on the other face of the insulation layer, which face is distal from the first electrode layer. The second electrode layer has multiple second electrodes. The wiring layer has multiple leads and is disposed at the non-touch section. The leads are selectively electrically connected to the first and second electrode layers. The film layer covers the second electrode layer and the wiring layer.

The fingerprint identification sensation layer is disposed on the other face of the film layer, which face is distal from the second electrode layer. The fingerprint identification sensation layer has multiple fingerprint identification chips and multiple transmission leads. The fingerprint identification chips are electrically connected with the transmission leads.

The fingerprint identification chips are integrated on the touch panel so that not only the manufacturing cost is lowered, but also the touch sensitivity and fingerprint identification precision are enhanced.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
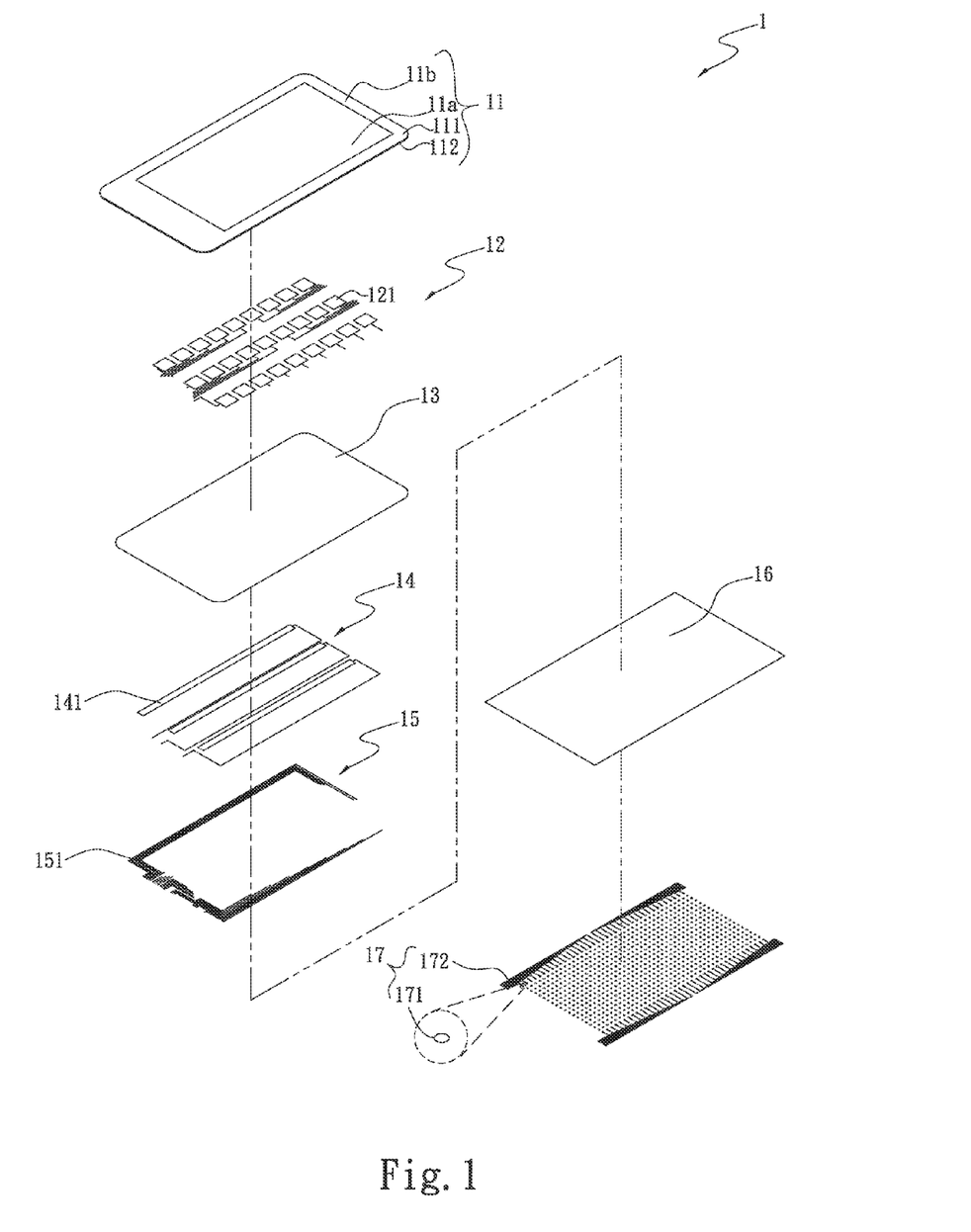
FIG. 1 is a perspective exploded view of a first embodiment of the touch device with fingerprint identification function of the present invention.
Figure 2:
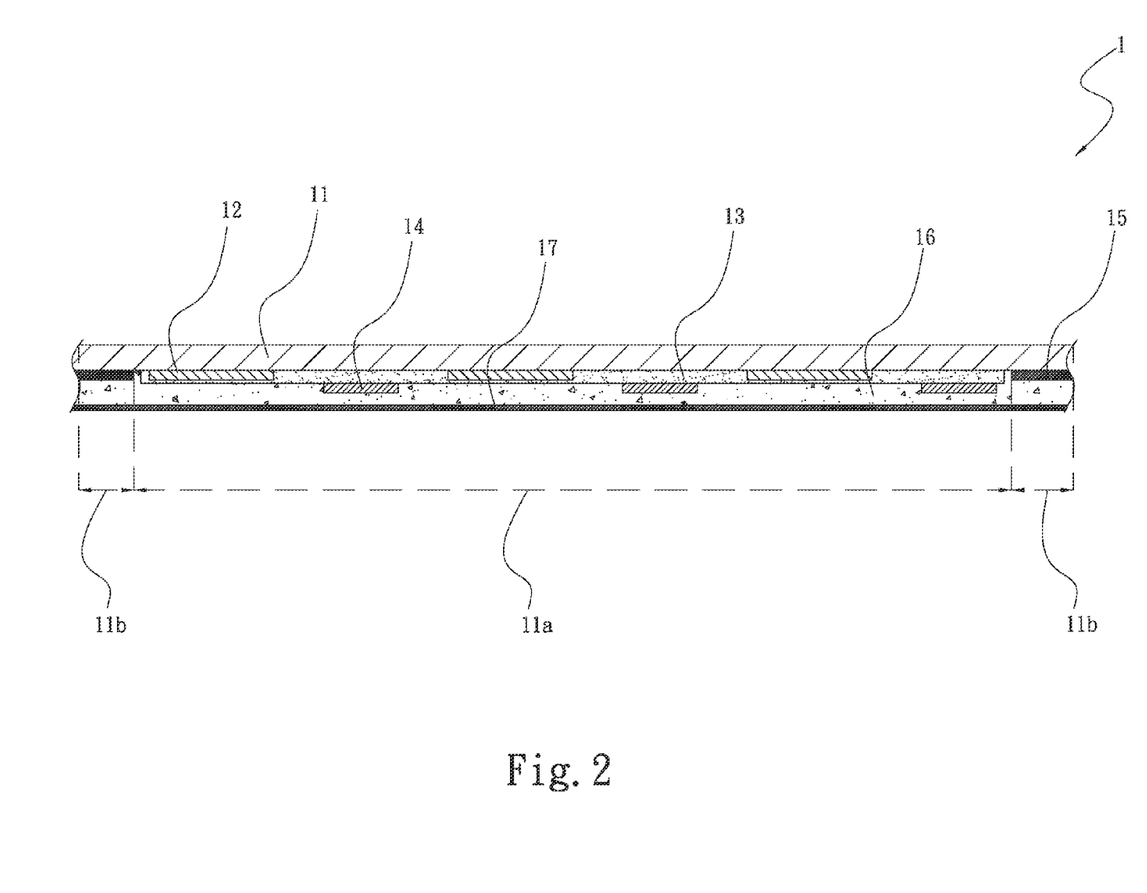
FIG. 2 is a sectional assembled view of the first embodiment of the touch device with fingerprint identification function of the present invention.

Please refer to FIGS. 1 and 2. FIG. 1 is a perspective exploded view of a first embodiment of the touch device with fingerprint identification function of the present invention. FIG. 2 is a sectional assembled view of the first embodiment of the touch device with fingerprint identification function of the present invention. According to the first embodiment, the touch device 1 with fingerprint identification function of the present invention includes a glass substrate 11, a first electrode layer 12, an insulation layer 13, a second electrode layer 14, a wiring layer 15, a film layer 16 and a fingerprint identification sensation layer 17.

The glass substrate 11 has a first face 111 and a second face 112 respectively disposed on upper and lower sides of the glass substrate 11. The first face 111 is defined with a touch section 11a and a non-touch section 11b. The non-touch section 11b is in adjacency to the touch section 11a. That is, the non-touch section 11b is disposed around the touch section 11a.

The first electrode layer 12 is disposed on the second face 112 of the glass substrate 11. The first electrode layer 12 has multiple first electrodes 121. The first electrodes 121 are disposed at the touch section 11a and partially extend to the non-touch section 11b.

The insulation layer 13 covers the first electrode layer 12.

The second electrode layer 14 is disposed on the other face of the insulation layer 13, which face is distal from the first electrode layer 12. The second electrode layer 14 has multiple second electrodes 141. The second electrodes 141 are also correspondingly disposed at the touch section 11a and partially extend to the non-touch section 11b.

The wiring layer 15 has multiple leads 151 and is disposed at the non-touch section 11b. The leads 151 are selectively electrically connected to the first and second electrode layers 12, 14. The film layer 16 covers the second electrode layer 14 and the wiring layer 15.

The fingerprint identification sensation layer 17 is disposed on the other face of the film layer 16, which face is distal from the second electrode layer 14. The fingerprint identification sensation layer 17 has multiple fingerprint identification chips 171 and multiple transmission leads 172. The fingerprint identification chips 171 are electrically connected with the transmission leads 172.

In the present invention, the multiple fingerprint identification chips 171 in the fingerprint identification sensation layer 17 and the first and second electrode layers 12, 14 are integrated in the touch section 11a to enhance the touch precision and lower manufacturing cost.

Figure 3:
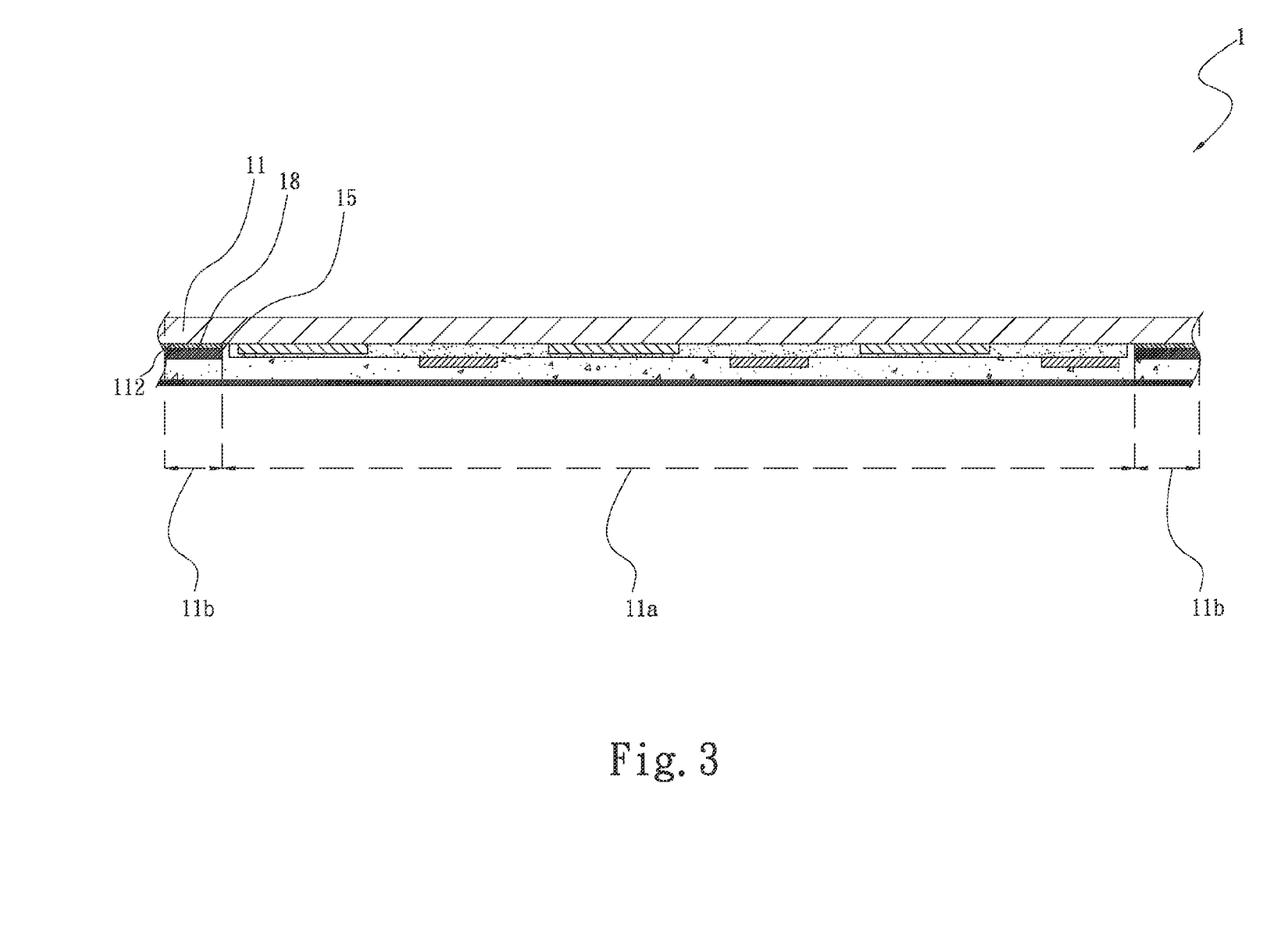
FIG. 3 is a sectional assembled view of a second embodiment of the touch device with fingerprint identification function of the present invention.

Please now refer to FIG. 3, which is a sectional assembled view of a second embodiment of the touch device with fingerprint identification function of the present invention. The second embodiment is partially identical to the first embodiment in structure and thus will not be repeatedly described hereinafter. The second embodiment is different from the first embodiment in that the touch device 1 with fingerprint identification function further has a shield layer 18. The shield layer 18 is disposed on the second face 112 of the glass substrate 11 at the non-touch section 11b. In addition, the shield layer 18 is disposed between the glass substrate 11 and the wiring layer 15. The shield layer 18 serves to shield the wiring layer 15 and avoid exposition of the wiring layer 15 to outer side.

Figure 4:
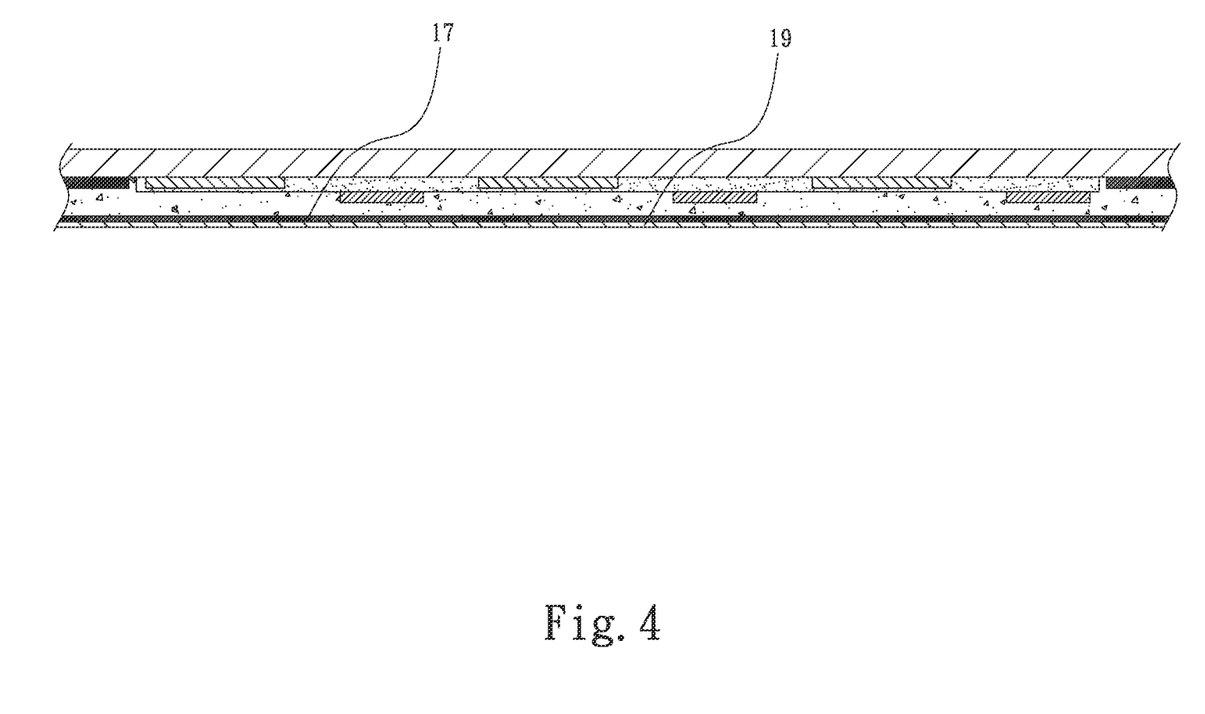
FIG. 4 is a sectional assembled view of a third embodiment of the touch device with fingerprint identification function of the present invention.

Please now refer to FIG. 4, which is a sectional assembled view of a third embodiment of the touch device with fingerprint identification function of the present invention. The third embodiment is partially identical to the first embodiment in structure and thus will not be repeatedly described hereinafter. The third embodiment is different from the first embodiment in that the touch device 1 with fingerprint identification function further has a protection layer 19. The protection layer 19 covers the fingerprint identification sensation layer 17. The material of the protection layer 19 is selected from a group consisting of epoxy, acrylic resin and silicone. The protection layer 19 serves to prevent the backside of the fingerprint identification sensation layer 17 from being exposed to outer side.

Figure 5:
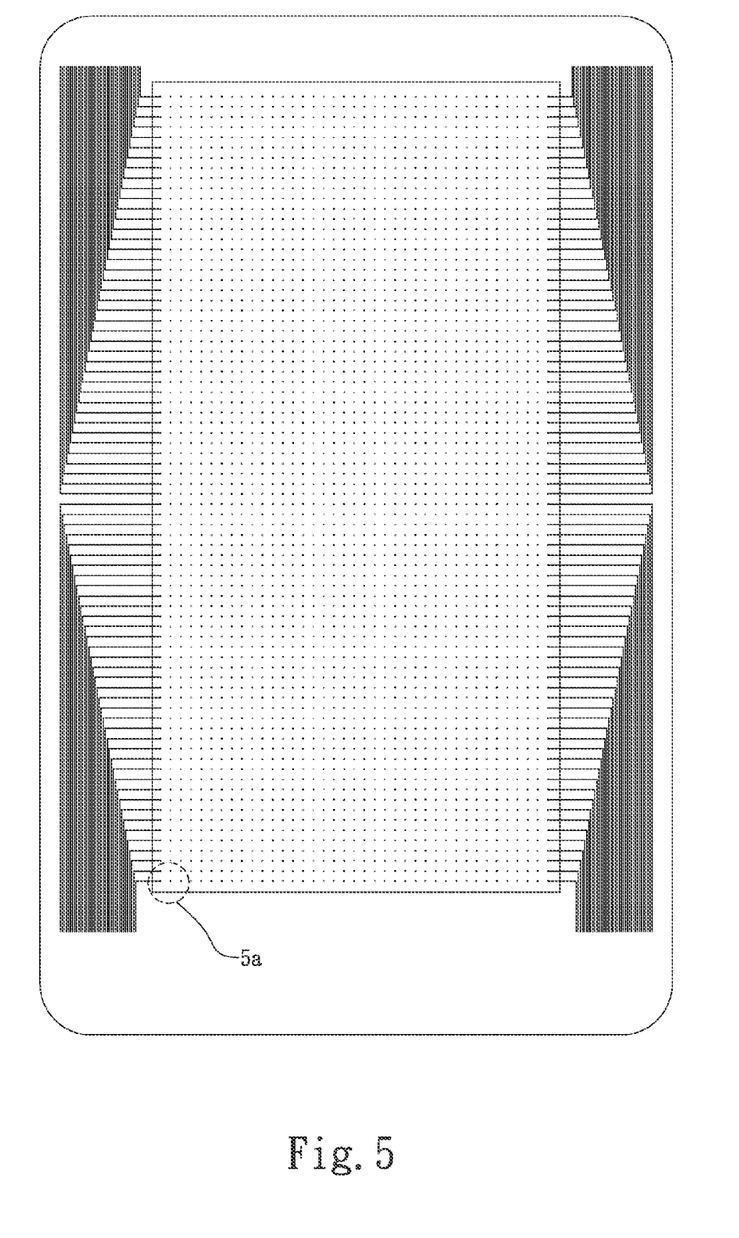
FIG. 5 is a top view of the fingerprint identification layer of a fourth embodiment of the touch device with fingerprint identification function of the present invention.
Figure 5A:
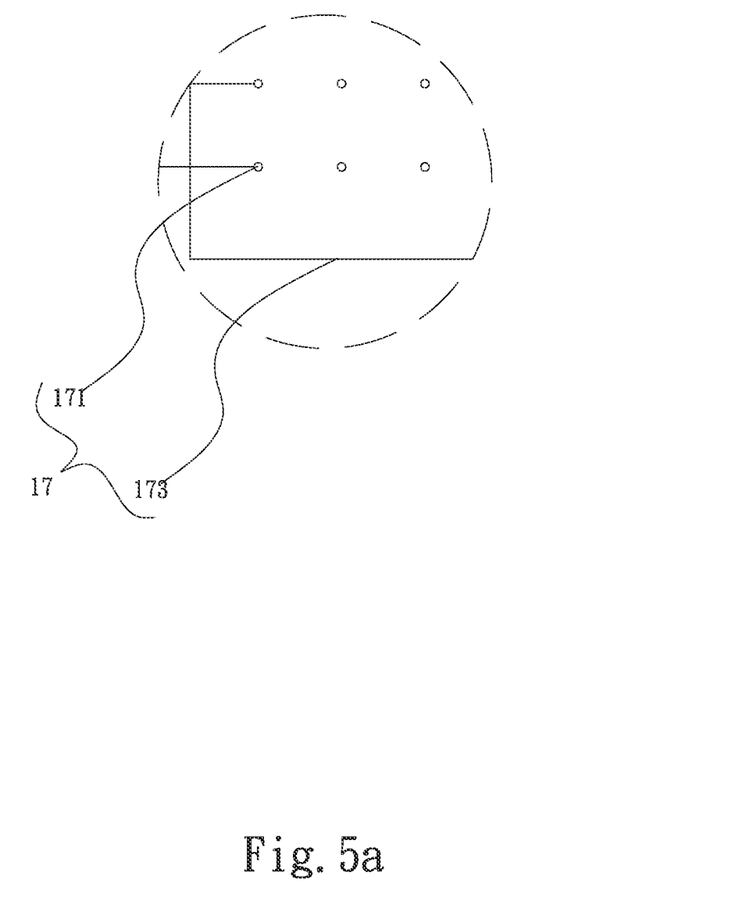
FIG. 5*a* is an enlarged view of a part of the fingerprint identification layer of the fourth embodiment of the touch device with fingerprint identification function of the present invention according to the circled area of FIG. 5.

Please now refer to FIGS. 5 and 5a. FIG. 5 is a top view of the fingerprint identification layer of a fourth embodiment of the touch device with fingerprint identification function of the present invention. FIG. 5a is an enlarged view of a part of the fingerprint identification layer of the fourth embodiment of the touch device with fingerprint identification function of the present invention according to the circled area of FIG. 5. The fourth embodiment is partially identical to the first embodiment in structure and thus will not be repeatedly described hereinafter. The fourth embodiment is different from the first embodiment in that the fingerprint identification sensation layer 17 further has multiple metal leads 173. The metal leads 173 are transparent and arranged in adjacency to the fingerprint identification chips 171. The metal leads 173 are arranged mainly to increase the fingerprint identification ratio of the fingerprint identification chips 171.

Figure 6:
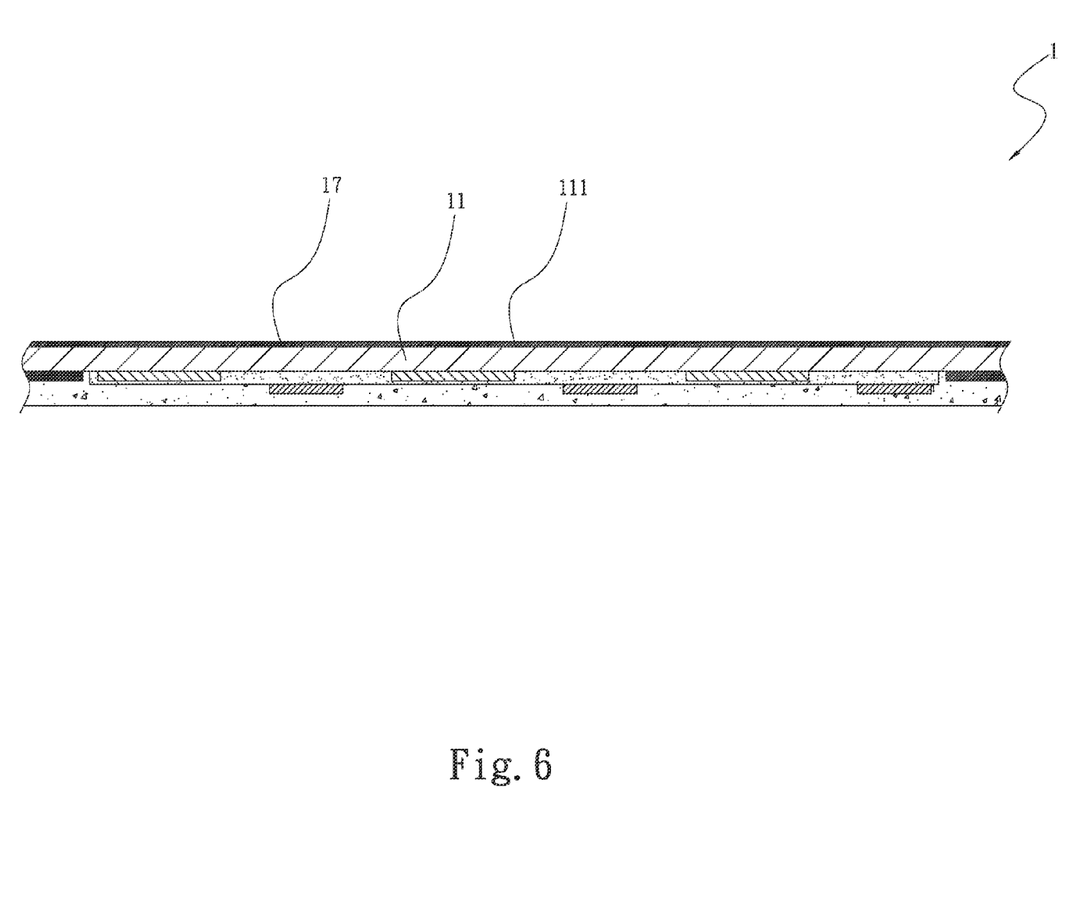
FIG. 6 is a sectional assembled view of a fifth embodiment of the touch device with fingerprint identification function of the present invention.

Please now refer to FIG. 6, which is a sectional assembled view of a fifth embodiment of the touch device with fingerprint identification function of the present invention. The fifth embodiment is partially identical to the first embodiment in structure and thus will not be repeatedly described hereinafter. The fifth embodiment is different from the first embodiment in that the fingerprint identification sensation layer 17 is disposed on the first face 111 of the glass substrate 11.

The present invention has been described with the above embodiments thereof and it is understood that many changes and modifications in the above embodiments can be carried out without departing from the scope and the spirit of the invention that is intended to be limited only by the appended claims.

What is claimed is:

1. A touch device with fingerprint identification function, the touch device comprising:
    a glass substrate having a first face and a second face respectively disposed on upper and lower sides of the glass substrate, the first face being defined with a touch section and a non-touch section, the non-touch section being in adjacency to the touch section;
    a first electrode layer disposed on the second face of the glass substrate, the first electrode layer having multiple first electrodes;
    an insulation layer covering the first electrode layer;
    a second electrode layer disposed on the other face of the insulation layer, which face is distal from the first electrode layer, the second electrode layer having multiple second electrodes, the first electrode layer and the second electrode layer being configured for sensing a touch;

a wiring layer having multiple leads and disposed at the non-touch section, the leads being selectively electrically connected to the first and second electrode layers;

a film layer covering the second electrode layer and the wiring layer; and a fingerprint identification sensation layer being configured for identification of a fingerprint selectively disposed on the other face of the film layer, which face is distal from the second electrode layer or disposed on the first face of the glass substrate, the fingerprint identification sensation layer having multiple fingerprint identification chips and multiple transmission leads, the fingerprint identification chips being disposed over the entire area of the touch section electrically connected with the transmission leads.

2. The touch device with fingerprint identification function as claimed in claim 1, further comprising a shield layer, the shield layer being disposed on the second face of the glass substrate at the non-touch section, the shield layer being disposed between the glass substrate and the wiring layer.

3. The touch device with fingerprint identification function as claimed in claim 1, further comprising a protection layer, the protection layer covering the fingerprint identification sensation layer, the protection layer being made of a material selected from a group consisting of epoxy, acrylic resin and silicone.

4. The touch device with fingerprint identification function as claimed in claim 1, wherein the fingerprint identification sensation layer further has multiple metal leads, the metal leads being transparent and arranged in adjacency to the fingerprint identification chips.

5. The touch device with fingerprint identification function as claimed in claim 1, wherein the non-touch section is disposed around the touch section.

\* \* \* \* \*